United States Patent
Nakanishi et al.

[11] Patent Number: 6,031,012
[45] Date of Patent: Feb. 29, 2000

[54] CURABLE COMPOSITION, FOAM PRODUCED THEREFROM, AND PROCESS FOR PRODUCING THE FOAM

[75] Inventors: Naoaki Nakanishi; Koji Himeno; Shintaro Komitsu, all of Hyogo, Japan

[73] Assignee: Kaneka Corporation, Osaka, Japan

[21] Appl. No.: 09/171,868

[22] PCT Filed: May 14, 1997

[86] PCT No.: PCT/JP97/01611

§ 371 Date: Oct. 27, 1998

§ 102(e) Date: Oct. 27, 1998

[87] PCT Pub. No.: WO97/43333

PCT Pub. Date: Nov. 20, 1997

[30] Foreign Application Priority Data

May 15, 1996 [JP] Japan ................................. 8-120318

[51] Int. Cl.$^7$ ................................. C08J 9/00; C08G 59/00
[52] U.S. Cl. ................................. 521/111; 528/12; 528/14; 528/29; 528/32; 528/92; 528/93; 528/95; 528/97; 528/98; 528/101; 521/82; 521/86; 521/88; 521/89; 521/90; 521/92; 521/97; 521/99; 521/110; 521/113; 521/134; 521/136; 521/139; 521/154; 521/180
[58] Field of Search ................................. 528/92, 93, 95, 528/97, 98, 101, 12, 14, 29, 32; 521/82, 86, 88, 89, 90, 92, 97, 99, 110, 111, 113, 134, 136, 139, 154, 180

[56] References Cited

FOREIGN PATENT DOCUMENTS

| 62-25690 | 6/1987 | Japan . |
| 3-188166 | 8/1991 | Japan . |
| 5-194782 | 8/1993 | Japan . |
| 5-271556 | 10/1993 | Japan . |

OTHER PUBLICATIONS

Database WPI Week 9313, Derwent Publications Ltd., London, GB; AN 93–106092 XP002102328 & JP 05 047964 A (Sumitomo Bakelite Co)* abstract *.

Database WPI Week 9007, Derwent Publications Ltd., London, GB; AN 90–049160 XP002102329 & JP 02 003409 A (Sumitomo Bakelite Co) * abstract *.

*Primary Examiner*—Samuel A. Acquah
*Attorney, Agent, or Firm*—Jordan and Hamburg LLP

[57] ABSTRACT

Provided is a curable composition comprising (A) a phenolic compound having a carbon-carbon double bond, (B) a compound having an SiH group, and (C) a foaming agent. The composition can be foamed and cured at room temperature or under heat at relatively low temperatures, and is poorly corrodable and poorly toxic.

9 Claims, No Drawings

CURABLE COMPOSITION, FOAM PRODUCED THEREFROM, AND PROCESS FOR PRODUCING THE FOAM

DESCRIPTION

1. Technical Field

The present invention relates to a novel curable composition which foams and cures at room temperature or under heat at relatively low temperatures to give foams which are poorly corrodable and poorly toxic, to the foams made from the composition, and to a method for producing the foams.

2. Background Art

As having good mechanical characteristics and flame retardancy, phenolic foams are widely used for soundproofing, heat insulation, water sealing, vapor sealing, damping, protection, cushioning, decoration, etc.

Phenolic foams include novolak foams to be produced by the use of acid catalysts and resolic foams to be produced by the use of alkali catalysts. To cure novolak foams, they must be heated, and their use is limited. Resolic foams can be cured at room temperature in the presence of acid catalysts, which, however, corrode metals. To solve this problem, neutralizing agents may be added to the curing system, but could not produce good results. Accordingly, desired are foams which can be produced and cured under heat at relatively low temperatures and which are poorly corrodable.

The present invention has been made in consideration of the current situation noted above, and its object is to provide a curable composition which is poorly corrodable and poorly toxic and which can be foamed and cured at room temperature or under heat at relatively low temperatures in a curing method quite different from the conventional method using acids, to provide foams made from the composition, and to provide a method for producing the foams.

Disclosure of the Invention

Having assiduously studied, we, the present inventors have found that the object can be attained by a curable composition comprising (A) a phenolic compound having a carbon-carbon doublebond, (B) a compound having an SiH group, and (C) a foaming agent.

The component (A) and the component (B) cure at room temperature or at relatively low temperatures through hydrosilylation for addition crosslinking. The component (C) acts as a foaming agent owing to the heat of the reaction, and produces a foam. Specifically, in the invention, the component (C) (foaming agent) absorbs the heat of vaporization or decomposition and prevents any rapid temperature increase during the reaction, and, as a result, foams having a fine cellular structure and a high expansion ratio are obtained. Preferably, the composition of the invention contains a hydrosilylation catalyst as an additional component (D).

The phenolic compound of the component (A) preferably has a molecular backbone comprising at least one structure selected from the following formulae (1) to (3):

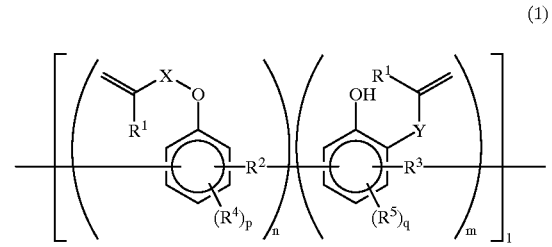

wherein $R^1$ represents H or $CH_3$; $R^2$ and $R^3$ each represent a divalent substituent having from 1 to 6 carbon atoms; $R^4$ and $R^5$ each represent a hydroxyl group and/or a monovalent substituent having from 0 to 6 carbon atoms; X and Y each represent a divalent substituent having from 0 to 10 carbon atoms; n and m each represent an integer of from 0 to 300; l represents an integer of from 1 to 300 and p and q each represent an integer of from 0 to 3.

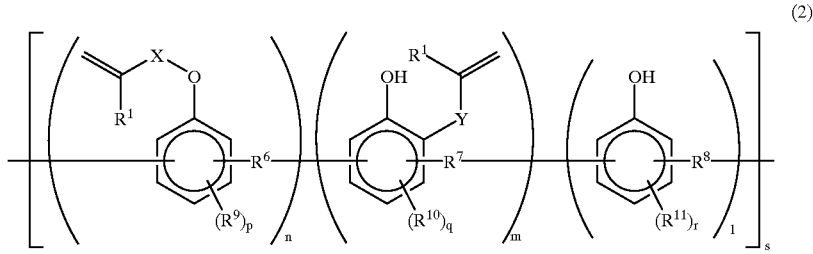

wherein $R^1$ represents H or $CH_3$; $R^6$, $R^7$ and $R^8$ each represent a divalent substituent having from 1 to 6 carbon atoms; $R^9$, $R^{10}$ and $R^{11}$ each represent a hydroxyl group and/or a monovalent substituent having from 0 to 6 carbon atoms; X and Y each represent a divalent substituent having from 0 to 10 carbon atoms; n and m each represent an integer of from 0 to 300 l and s each represent an integer of from 1 to 300; and p, q and r each represent an integer of from 0 to 3.

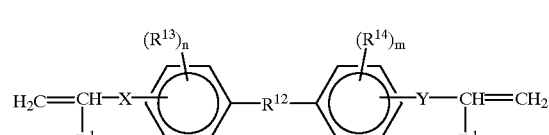

wherein $R^1$ represents H or $CH_3$; $R^{12}$ represents a divalent substituent having from 0 to 6 carbon atoms; $R^{13}$ and $R^{14}$ each represent a hydroxyl group and/or a monovalent substituent having from 0 to 10 carbon atoms; X and Y each represent a divalent substituent having from 0 to 10 carbon atoms; and n and m each represent an integer of from 0 to 4.

The SiH-having compound of the component (B) is preferably a compound to be represented by the following structural formula (4):

(4)

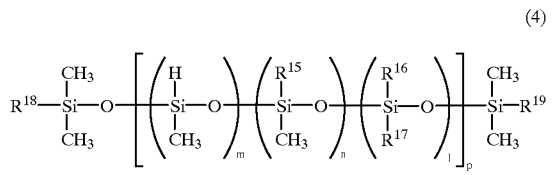

wherein $m \geq 2$; $n, l, p \geq 0$; $10 \leq (m+n+l) \times p \leq 80$; $R^{16}, R^{17}, R^{18}$ and $R^{19}$ each represent a hydrogen atom or a hydrocarbon group having from 1 to 20 carbon atoms, which may have at least one phenyl group; $R^{15}$ represents a substantially polyoxyalkylene group, and/or an organic group derived from the reaction of a hydrosilyl group with an alkenyl-aromatic compound.

As the foaming agent of the component (C), preferred are volatile compounds having a boiling point of not higher than 100° C. The volatile compounds are preferably selected from hydrocarbons, flons, carbon dioxide, air and nitrogen.

To obtain foams from the curable composition, at least two compositions each comprising, as the main component, any of the component (A) and the component (B) are prepared, and mixed to be foamed and cured.

Alternatively, at least two compositions each comprising, as the main component, any of the component (A) and the component (B) are prepared and mixed just before use, and the resulting mixture is directly sprayed over the surface of a substrate or cast into a mold, and foamed and cured.

Best Modes of Carrying out the Invention

The component (A) for use in the invention is not specifically defined, provided that it has a carbon-carbon double bond at which it reacts with the component (B) through hydrosilylation for addition crosslinking. Preferably, however, the component (A) has a backbone of a phenolic resin that is necessary to the moldings of the composition for their mechanical characteristics. As the component (A), preferred are compounds of the following structural formulae (1) to (3), since the raw materials for those are easily available.

(1)

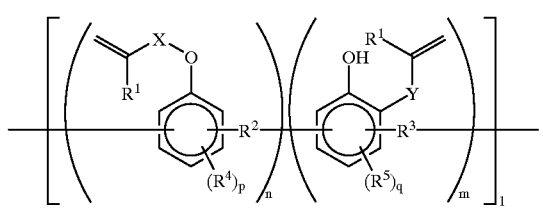

wherein $R^1$ represents H or $CH_3$; $R^2$ and $R^3$ each represent a divalent substituent having from 1 to 6 carbon atoms; $R^4$ and $R^5$ each represent a hydroxyl group and/or a monovalent substituent having from 0 to 6 carbon atoms; X and Y each represent a divalent substituent having from 0 to 10 carbon atoms; n and m each represent an integer of from 0 to 300 l each represent an integer of from 1 to 300; and p and q each represent an integer of from 0 to 3.

(2)

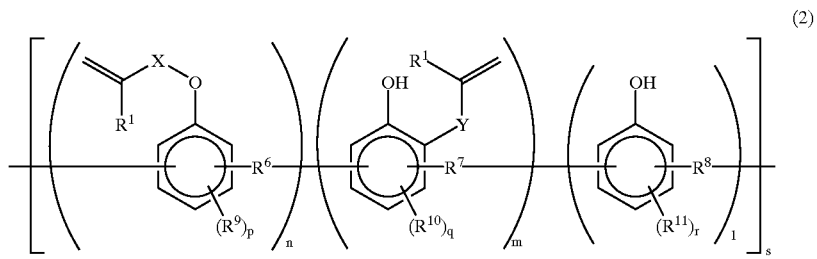

wherein $R^1$ represents H or $CH_3$; $R^6$, $R^7$ and $R^8$ each represent a divalent substituent having from 1 to 6 carbon atoms; $R^9$, $R^{10}$ and $R^{11}$ each represent a hydroxyl group and/or a monovalent substituent having from 0 to 6 carbon atoms; X and Y each represent a divalent substituent having from 0 to 10 carbon atoms; n and m each represent an integer of from 0 to 300 l and s each represent an integer of from 1 to 300; and p, q and r each represent an integer of from 0 to 3.

(3)

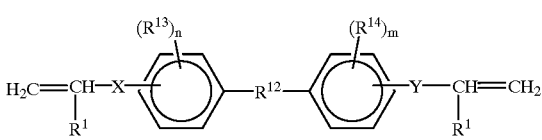

wherein $R^1$ represents H or $CH_3$; $R^{12}$ represents a divalent substituent having from 0 to 6 carbon atoms; $R^{13}$ and $R^{14}$ each represent a hydroxyl group and/or a monovalent substituent having from 0 to 10 carbon atoms; X and Y each represent a divalent substituent having from 0 to 10 carbon atoms; and n and m each represent an integer of from 0 to 4.

The phenol compound to form the phenolic resin backbone is not specifically defined, and any and every ordinary one is employable herein. For example, it includes novolak and/or resolic phenols from phenol, cresol, xylenol, resorcinol catechol, pyrogallol, etc.; and bisphenolic compounds such as bisphenol A, bisphenol F, bisphenol S, tetrabromobisphenol A, etc.

In vies of its availability, allylated bisphenol A is preferable. As examples of the allylated bisphenol A, mentioned are 2,2'-diallylbisphenol A, O,O'-diallyl bisphenol A and so on.

To introduce an alkenyl group into the phenolic resin backbone, employed are two methods, one comprising first producing a phenolic resin backbone with no alkenyl group and thereafter introducing an alkenyl group thereinto, and the other comprising producing a phenolic resin backbone with an alkenyl group partly or entirely from an alkenyl-having compound.

In the former method where an alkenyl group is introduced into a phenolic resin backbone already produced, for example, a main chain backbone having a functional group such as a hydroxyl group, an alkoxide group, a carboxyl group, an epoxy group or the like, at the terminal or in the main chain or side chain is first produced, and then this is reacted with an organic compound having both an active group that is active to the functional group and an alkenyl group, to thereby introduce the alkenyl group thereinto.

Examples of the organic group having both an active group that is active to the functional group and an alkenyl group include $C_{3-20}$ unsaturated fatty acids, acid halides and acid anhydrides, such as acrylic acid, methacrylic acid, vinylacetic acid, acrylic acid chloride, acrylic acid bromide, etc.; unsaturated aliphatic alcohols such as vinyl alcohol, allyl alcohol, 3-buten-1-ol, 4-penten-1-ol, 5-hexen-1-ol, 6-hepten-1-ol, 7-octen-1-ol, 8-nonen-1-ol, 9-decen-1-ol, 2-(allyloxy) ethanol, neopentyl glycol monoallyl ether, glycerin diallyl ether, trimethylolpropane diallyl ether, trimethylolethane diallyl ether, pentaerythritol triallyl ether, 1,2,6-hexanetriol diallyl ether, sorbitan diallyl ether, vinylbenzyl alcohol, etc.; $C_{3-20}$ unsaturated aliphatic alcohol-substituted carbonic acid halides such as allyl chloroformate ($CH_2$=$CHCH_2OCOCl$), allyl bromoformate ($CH_2$=$CHCH_2OCOBr$), etc.; and allyl chloride, allyl bromide, vinyl(chloromethyl)benzene, allyl(chloromethyl)benzene, allyl(bromomethyl)benzene, allyl (chloromethyl) ether, allyl (chloromethoxy) benzene, 1-butenyl (chloromethyl) ether, 1-hexenyl(chloromethoxy)benzene, allyloxy(chloromethyl) benzene, allyl isocyanate, allyl glycidyl ether, etc. Examples of the concrete reaction include a method of reacting a phenol group with a halogenoallyl compound in the presence of a basic catalyst; a method of reacting a phenol group with allyl glycidyl ether in the presence of an epoxidation catalyst; and a method of reacting an isocyanate with allyl alcohol in the presence of an urethanation catalyst.

For the alkenyl group introduction, also employable is interesterification. This is to interesterify the alcohol residue in the ester moiety of a polyester or acrylic resin with an alkenyl-having alcohol or phenol derivative in the presence of an interesterification catalyst. The alkenyl-having alcohol and phenol derivatives to be used for the interesterification with the alcohol residue may be any alcohol or phenyl derivatives having at least one alkenyl group and at least one hydroxyl group. The catalyst may be or may not be used. If used, the catalyst is preferably any of acids or titanium or tin catalysts.

In the method of producing a phenolic resin backbone partly or entirely from an alkenyl-having compound, an aromatic compound having a double bond is reacted with a phenol, for example, along with formaldehyde or diisocyanate. Concretely, allylphenol is polycondensed with any other phenol in the presence of an acid or base, along with formaldehyde.

The number of carbon-carbon double bonds in the component (A) is preferably larger than 1.0/molecule on average, more preferably not smaller than 2/molecule. If the number of carbon-carbon double bonds in the component (A) is not larger than 1/molecule, the reaction of the component (A) with the component (B) does not produce a crosslinked structure.

The structure of the component (A) may be linear or branched, and the molecular weight thereof is not specifically defined. However, in order to uniformly mix the component (A) with the component (B) and to foam the resulting mixture, it is desirable that the component (A) has a mean molecular weight of from 100 to 100,000, more preferably from 100 to 10,000.

The SiH-having compound of the component (B) is not specifically defined, and may be any of linear or cyclic organohydrogenpolysiloxanes or hydrosilyl-having organic compounds having a molecular weight of not larger than 30,000.

As examples of the linear or cyclic organohydrogenpolysiloxanes, mentioned are compounds of the following general formula (4) or (5):

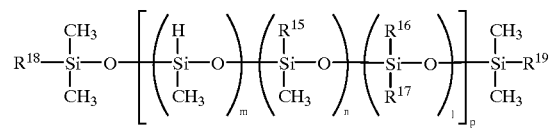

(4)

wherein m≧2; n, l, p≧0; 10≦(m+n+l)×p≦80; $R^{16}$, $R^{17}$, $R^{18}$ and $R^{19}$ each represent a hydrogen atom or a hydrocarbon group having from 1 to 20 carbon atoms, which may have at least one phenyl group; $R^{15}$ represents a substantially polyoxyalkylene group, and/or an organic group derived from the reaction of a hydrosilyl group with an alkenyl-aromatic compound.

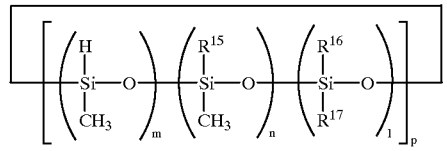

(5)

wherein m≧2; n, l, p≧0; 3≦(m+n+l)×p≦20; $R^{15}$ represents a substantially polyoxyalkylene group, and/or an organic group derived from the reaction of a hydrosilyl group with an alkenyl-aromatic compound; $R^{16}$ and $R^{17}$ each represent a hydrogen atom or a hydrocarbon group having from 1 to 20 carbon atoms, which may have at least one phenyl group.

To obtain the polyorganohydrogensiloxanes of formulae (4) and (5), employable is a method of reacting a polyoxyalkylene compound having a functional group capable of reacting with SiH, such as a double bond (e.g., allyl group), a hydroxyl group or the like at the terminal with a polyorganohydrogensiloxane; a method of producing them from polyoxyalkylene chain-having silicon compounds; or a method of reacting a polyoxyalkylene chain-having silicon compound with a polyorganosiloxane for rearrangement therebetween.

Concretely, for example, a linear or cyclic polyorganohydrogensiloxane of a formula (6) or (7):

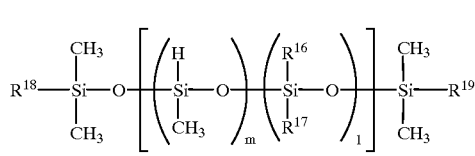
(6)

wherein m≧2; l, p≧0; 10≦(m+l)×p≦80; $R^{16}$, $R^{17}$, $R^{18}$ and $R^{19}$ each represent a hydrogen atom or a hydrocarbon group having from 1 to 20 carbon atoms, which may have at least one phenyl group,

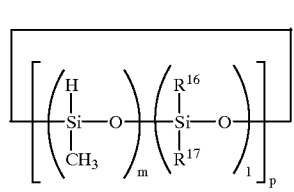
(7)

wherein m≧2; l, p≧0; 3≦(m+l)×p≦20; $R^{16}$ and $R^{17}$ each represent a hydrogen atom or a hydrocarbon group having from 1 to 20 carbon atoms, which may have at least one phenyl group, is reacted with any of the following:

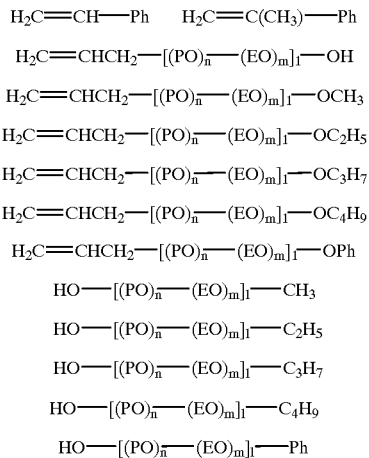

(l ≦ (m + n) × l ≦ 80, m, n, l ≧ 0);

or the linear or cyclic polyorganohydrogensiloxane of formula (6) or (7) is reacted with any of the following:

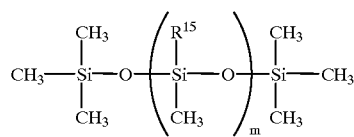

wherein 5≦m≦80; and $R^{15}$ represents a polyoxyalkylene chain having a molecular weight of from 100 to 10,000, or a hydrocarbon group having from 2 to 20 carbon atoms, which may have at least one phenyl group,

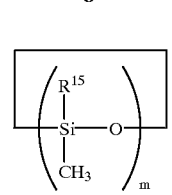

wherein 3≦m≦20; and $R^{15}$ represents a polyoxyalkylene chain having a molecular weight of from 100 to 10,000, or a hydrocarbon group having from 2 to 20 carbon atoms, which may have at least one phenyl group, for rearrangement or equilibration therebetween.

The other hydrosilyl-having organic compounds having a molecular weight of not larger than 30,000 are not specifically defined for their structure. Examples of the compounds may be represented by the following general formula (8):

$$R^{20}X_a \quad (8)$$

wherein X represents a group having at least one hydrosilyl group; $R^{20}$ represents a mono- to tetra-valent organic group having from 2 to 150 carbon atoms; and a represents an integer of from 1 to 4.

In formula (8), X represents a group having at least one hydrosilyl group. Specific examples of the group of X include hydrosilyl groups as derived from various polyhydrogensiloxanes, which are represented by the following formulae (9) to (11):

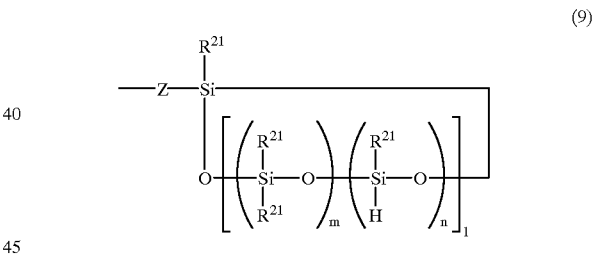
(9)

wherein 1≦(m+n)×l≦10; n≧1; $R^{21}$ represents any of a methyl, ethyl or phenyl group; Z represents a divalent substituent having from 0 to 10 carbon atoms and composed of constituent elements of C, H, N, O, S, Si and halogen only,

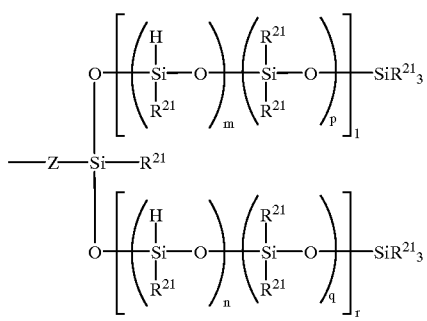
(10)

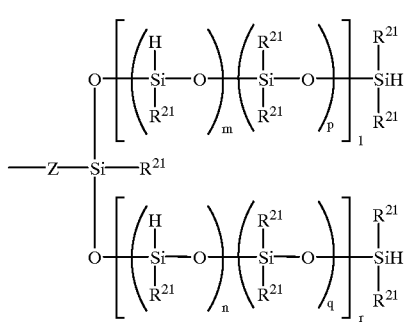

(11)

wherein $1 \leq (m+p) \times l + (n+q) \times r \leq 10$; $m+n \geq 1$; $l, p, q, r \geq 0$; $R^{21}$ represents any of a methyl, ethyl or phenyl group; Z represents a divalent substituent having from 0 to 10 carbon atoms and composed of constituent elements of C, H, N, O, S, Si and halogen only, and the following hydrosilyl groups:

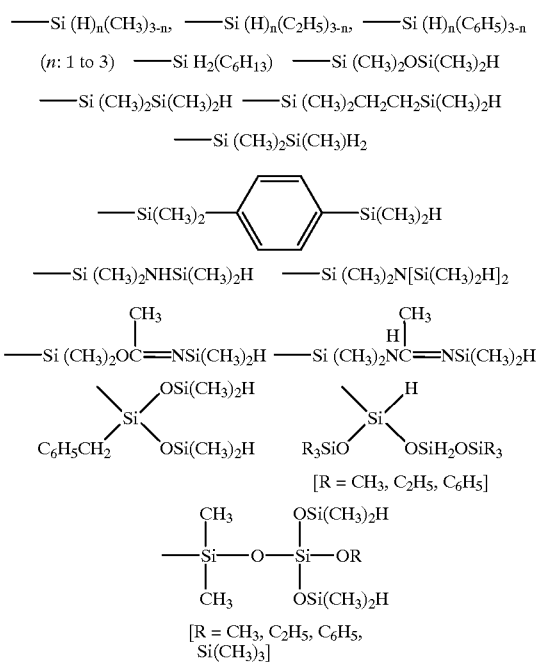

As examples of the divalent substituent Z in formulae (9) to (11), mentioned are the following:

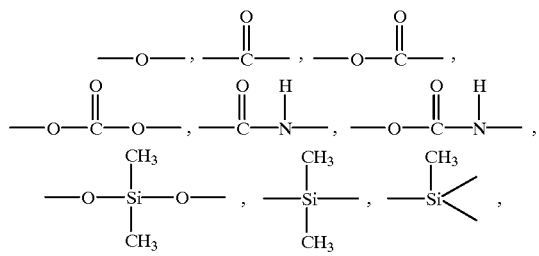

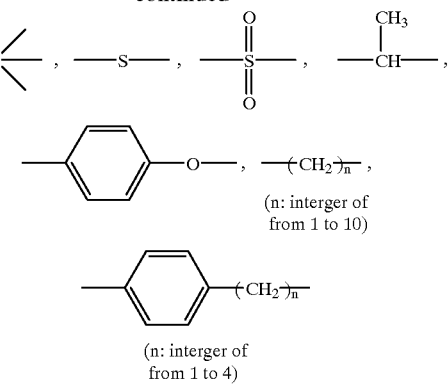

Two or more of those divalent substituents may be bonded to each other via a covalent bond therebetween to give one divalent substituent Z.

More specific examples of the hydrosilyl groups of formulae (9) to (11) include the following:

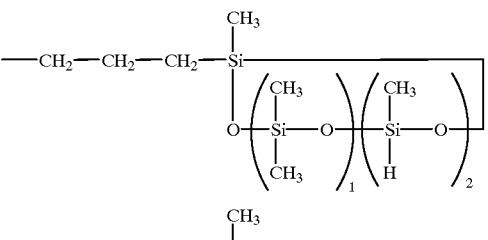

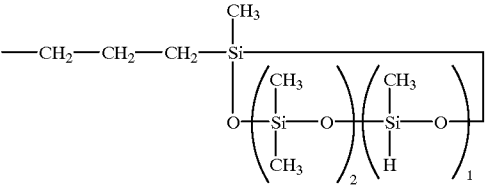

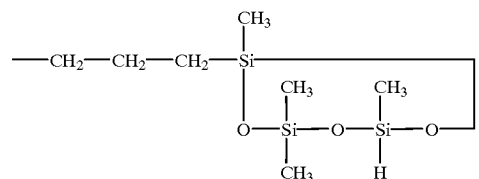

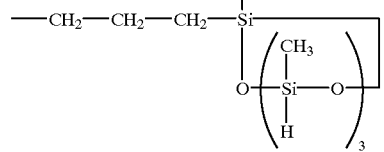

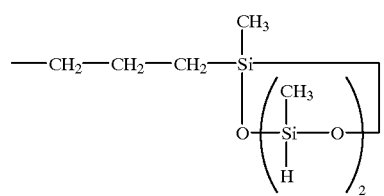

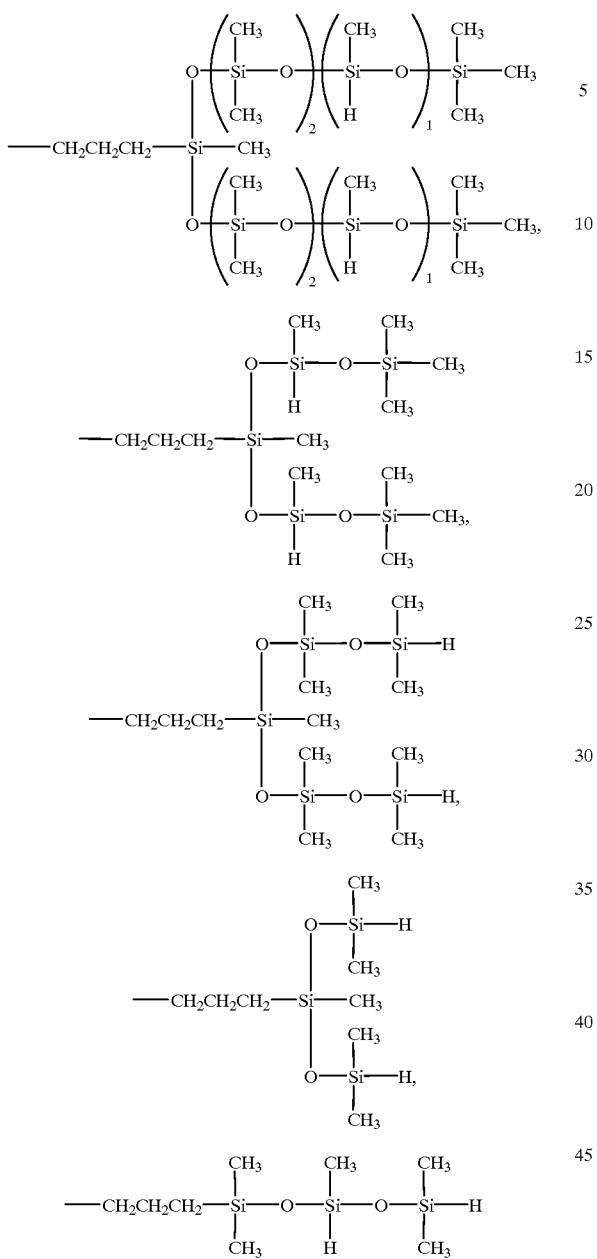

Of various hydrosilyl groups mentioned above, especially preferred are those mentioned below, in view of the miscibility of the component (B) comprising them with the other components and of the reactivity of those hydrosilyl groups themselves.

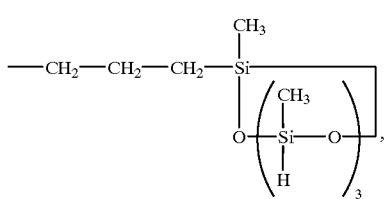

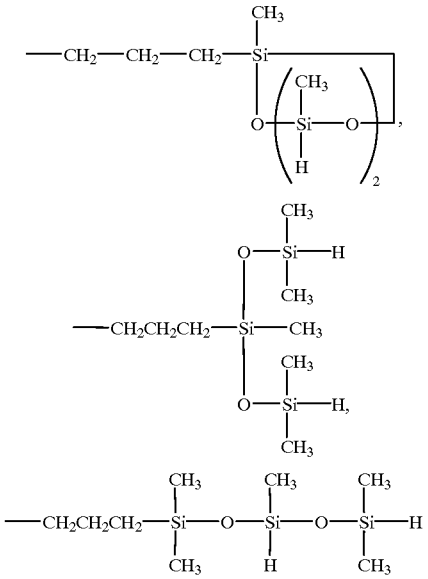

$R^{20}$ in formula (8) is not specifically defined, provided that it is a mono- to tetra-valent organic group directly bonding to the group X via a covalent bond therebetween. It includes, for example, the following:

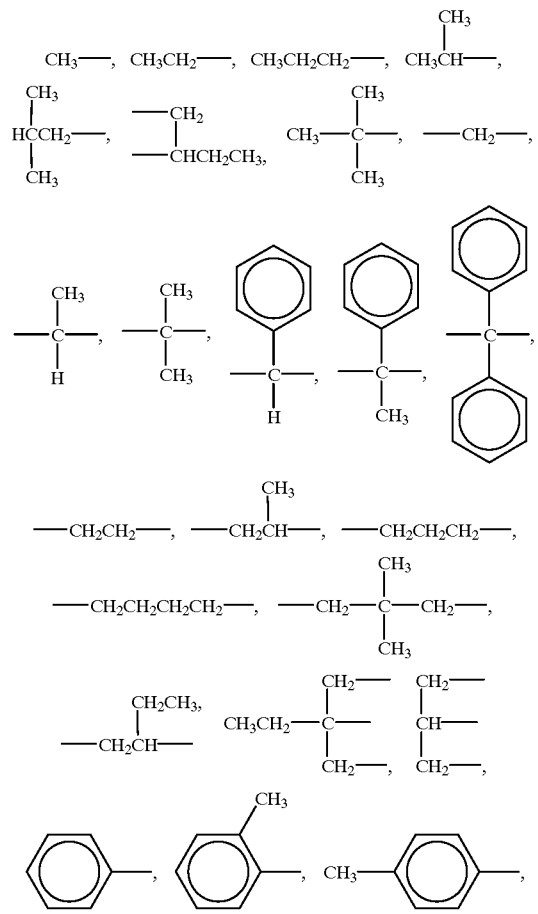

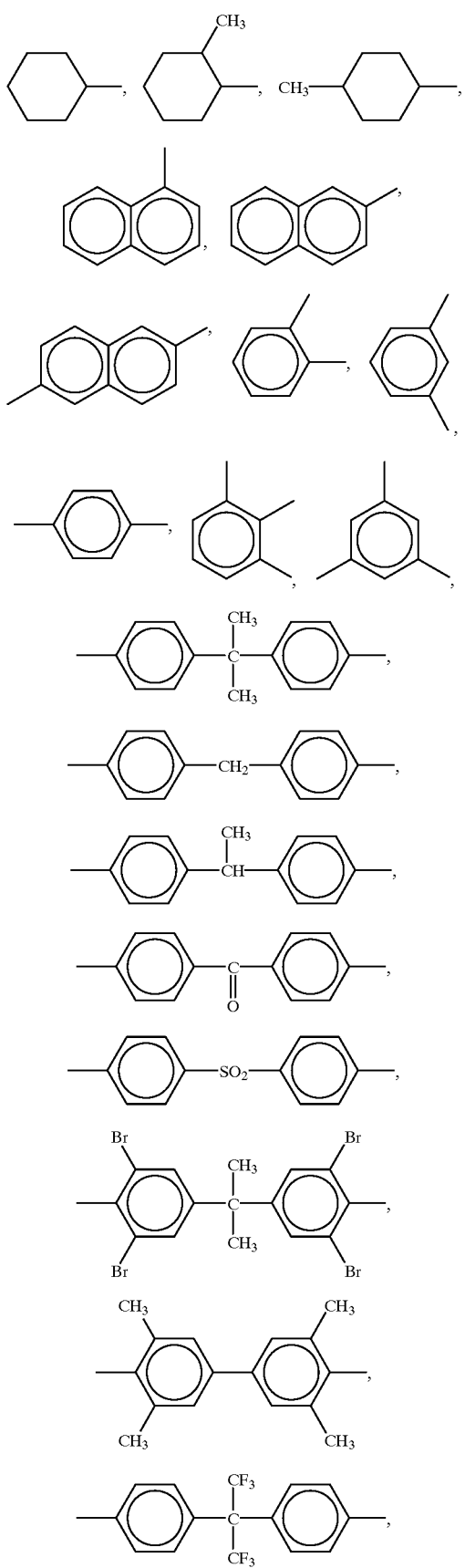
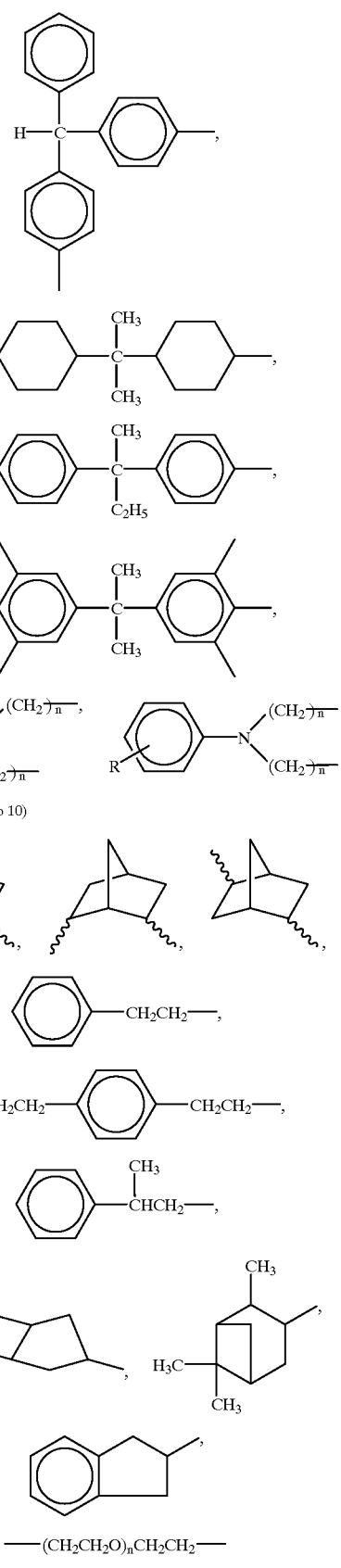
(n: integer of from 2 to 10)
(n: integer of from 1 to 5)

-continued

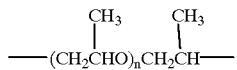

(n: integer of from 1 to 5)

—(CH$_2$CH$_2$CH$_2$O)$_n$CH$_2$CH$_2$CH$_2$—

(n: integer of from 1 to 5)

—(CH$_2$CH$_2$CH$_2$CH$_2$O)$_n$CH$_2$CH$_2$CH$_2$CH$_2$—

(n: integer of from 1 to 5)

In the formulae mentioned above, the waved line in the bicyclic compounds indicates any of endo- or exo-configuration.

Of those, preferred are the following groups, in view of the miscibility of the component (B) comprising them with the component (A).

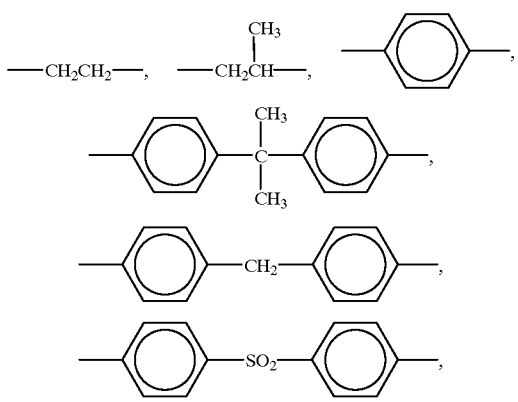

-continued

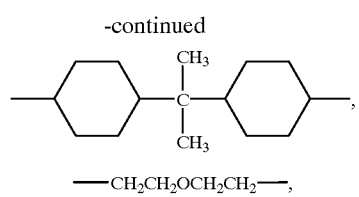

—CH$_2$CH$_2$OCH$_2$CH$_2$OCH$_2$CH$_2$—,

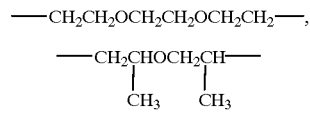

The method for producing the hydrosilyl-having organic compounds of formula (8) is not specifically defined, and any desirable method is employable for the production. For example, employable are (i) a method of treating a curing agent precursor having an SiCl group in the molecule with a reducing agent such as LiAlH$_4$, NaBH$_4$ or the like to thereby reduce the SiCl group in the precursor into an SiH group; (ii) a method of reacting an organic compound having a functional group X in the molecule with a compound having both a functional group Y capable of reacting with the functional group X and a hydrosilyl group in the molecule; and (iii) a method of selectively hydrosilylating an alkenyl-having organic compound with a polyhydrosilane compound having at least two hydrosilyl groups to thereby make the thus-reacted organic compound still have a hydrosilyl group in the molecule.

Of those methods, generally preferred is the method (iii), as the reaction steps constituting it are simple. In this case, two or more hydrosilyl groups in some polyhydrosilane compounds will react with the alkenyl group in the organic compound to increase the molecular weight of the resulting products. The products of organic compounds having such an increased molecular weight can also be used as the component (B) with no problem.

More specific examples of the component (B) are mentioned below.

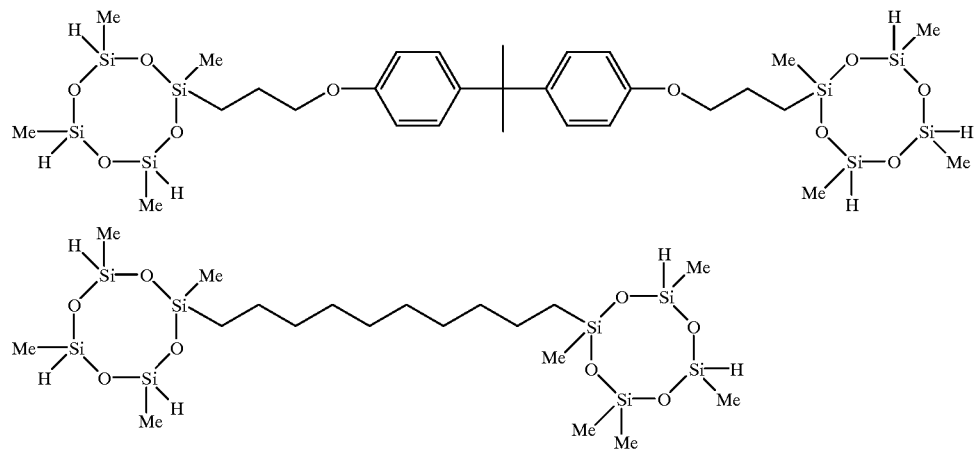

The number of the hydrosilyl groups to be in the component (B) for use in the invention shall be at least one on average in one molecule, but is preferably larger without interfering with the miscibility of the component (B) with the other components. In the invention, the component (A) and the component (B) are cured through hydrosilylation. For this, if the number of hydrosilyl groups in the component (B) is smaller than 2, the curing will be retarded and will often produce curing failures.

The compositional ratio of the component (A) and the component (B) is not specifically defined, but shall be suitably determined depending on the structures of those components and on the intended physical properties of cured products. Preferably, however, the ratio of the molar number x of the carbon-carbon double bond in the component (A) to the molar number y of the SiH group in the component (B), x/y, falls between 1/30 and 30/1, more preferably between 1/10 and 10/1. If the component (A) is excess over the defined range, the crosslinking density of the cured product will be low and the product could not have good mechanical strength. On the contrary, if the component (B) is excess over the defined range, sufficient crosslinking could not be attained.

The foaming agent of the component (C) for use in the invention is not specifically defined, and may be selected from any ordinary foaming agents applicable to organic foams of polyurethanes, phenols, polystyrenes, polyolefins, etc. In order to produce stable foams, however, a volatile compound is previously added to the composition as the foaming agent, and the composition is foamed under heat or under reduced pressure.

Where a volatile compound is used as the foaming agent, it is desirable that the compound has a boiling point of not higher than 100° C., more preferably not higher than 80° C., even more preferably not higher than 50° C. In consideration of the equipment for foaming and of the easiness in handling the compound, it is desirable that the compound has a boiling point of from −30° C. to 35° C. or so.

The type of the volatile compound is not specifically defined. In view of their handleability and safety, however, preferably used are one or more selected from organic compounds such as hydrocarbons, flons, ethers, etc., and carbon dioxide, nitrogen, air, etc., either singly or as combined.

The hydrocarbons include methane, ethane, propane, n-butane, isobutane, n-pentane, isopentane, neopentane, n-hexane, 2-methylpentane, 3-methylpentane, 2,2-dimethylbutane, 2,3-dimethylbutane, cyclobutane, cyclopentane, cyclohexane, etc.

The flons include trichlorofluoromethane (R11), dichlorodifluoromethane (R12), chlorotrifluoromethane (R13), bromotrifluoromethane (R13B1), tetrafluoromethane (R14), dichlorofluoromethane (R21), chlorodifluoromethane (R22), trifluoromethane (R23), difluoromethane (R32), fluoromethane (R41), tetrachlorodifluoroethane (R112), trichlorotrifluoroethane (R113), dichlorotetrafluoroethane (R114), dibromotetrafluoroethane (R114B2), chloropentafluoroethane (R115), hexafluoroethane (R116), chlorotrifluoroethane (R123), tetrafluoroethane (R134a), dichlorofluoroethane (R141b), chlorodifluoroethane (R142b), difluoroethane (R152a), octafluoropropane (R218), dichloropentafluoropropane (R225), hexafluoropropane (R236ea), pentafluoropropane (R245fa), octafluorocyclobutane (RC318), hexafluorobutane (R356mffm), pentafluorobutane (R365mfc), decafluorohexane (R4310mee), etc. In view of the environmental problems with those flons, hydrochlorofluorocarbons (HCFC) of so-called substituent flons are preferred to chlorofluorocarbons (CFC), and more preferred are hydrofluorocarbons (HFC). Especially preferred are tetrafluoroethane, difluoroethane, octafluoropropane, hexafluoropropane, pentafluoropropane, octafluorocyclobutane, hexafluorobutane and pentafluorobutane.

The ethers include dimethyl ether, diethyl ether, ethylmethyl ether, dipropyl ether, diisopropyl ether, butylmethyl ether, butylethyl ether, tert-butylmethyl ether tert-butylethyl ether, 1,1-dimethylpropylmethyl ether, methylpentafluoroethyl ether, 2,2,2-trifluoroethyl ether, methyl (trifluoromethyl)tetrafluoroethyl ether, etc.

As other means of foaming the composition, also employable are inorganic foaming agents such as NaHCO3, $(NH_4)_2CO_3$, $NH_4HCO_3$, $NH_2NO_2$, $Ca(N_3)_2$, $NaBH_4$, etc.; organic foaming agents such as azodicarbonamide, azobisisobutyronitrile, barium azodicarboxylate, dinitrosopentamethylenetetramine, paratoluenesulfonylhydrazide, etc.; carbon dioxide to be generated by the reaction of isocyanates with active hydrogen-containing compounds; mechanical stirring, etc. Any of those foaming means may be combined with the foaming agent (C).

In the invention, usable is a catalyst for hydrosilylation as the component (D).

The hydrosilylation catalyst includes a simple substance of platinum; solid platinum as carried by a carrier such as alumina, silica, carbon black or the like; chloroplatinic acid; complexes of chloroplatinic acid with alcohols, aldehydes, ketones, etc.; platinum-olefin complexes (e.g., $Pt(CH_2=CH_2)_2(PPh_3)_2$, $Pt(CH_2=CH_2)_2Cl_2$), platinum-vinylsiloxane complexes (e.g., $Pt_n(ViMe_2SiOSiMe_2Vi)_n$, $Pt[(MeViSiO)_4]_m$), platinum-phosphine complexes (e.g., $Pt(PPh_3)_4$, $Pt(PBu_3)_4$), platinum-phosphite complexes (e.g., $Pt[P(OPh)_3]_4$, $Pt[P(OBu)_3]_4$) (in those formulae, Me is amethyl group, Bu is a butyl group, Vi is a vinyl group, Ph is a phenyl group, and n and m are integers); dicarbonyldichloro-platinum, Karstedt catalysts; platinum-hydrocarbon composites described in Ashby's U.S. Pat. Nos. 3,159,601 and 3,159,662; and platinum alcoholate catalysts described in Lamoreaux's U.S. Pat. No. 3,220,972. In addition, platinum chloride-olefin composites described in Modic's U.S. Pat. No. 3,516,946 are also usable in the invention. As other examples of the catalysts except platinum compounds, mentioned are $RhCl (PPh_3)_3$, $RhCl_3$, $Rh/Al_2O_3$, $RuCl_3$, $IrCl_3$, $FeCl_3$, $AlCl_3$, $PdCl_2.2H_2O$, $NiCl_2$, $TiCl_4$, etc. Of those, preferred are chloroplatinic acid, platinum-olefin complexes and platinum-vinylsiloxane complexes, as having high catalytic activity. One or more of these catalysts are usable herein either singly or as combined.

The amount of the catalyst to be added is not specifically defined, but is preferably between $10^{-1}$ and $10^{-8}$ mols, more preferably between $10^{-2}$ and $10^{-6}$ mols, per mol of SiH.

Along with the catalyst noted above, employable is a promoter of phosphine compounds and phosphine complexes. The phosphine compounds include triphenylphosphine, $PMe_3$, $PEt_3$, $PPr_3$ (where Pr is a propyl group, and the same shall apply hereinunder), $P(n-Bu)_3$, $P(cyclo-C_6H_{11})_3$, $P(P-C_6H_4Me)_3$, $P(o-C_6H_4Me)_3$, etc., which, however, are not limitative. The phosphine complexes include, for example, $Cr(CO)_5PPh_3$, $Cr(CO)_4 (PPh_3)_2$ (cis- and trans-isomers), $Cr(CO)_3(PPh_3)_3$ (fac- and mer-isomers), and Mo and V analogues of those Cr compounds; $Fe(CO)_4PPh_3$, $Fe(CO)_3(PPh_3)_2$, and Ru and Os analogues of those Fe compounds; $COCl_2(PPh_3)$, $RhCl(PPh_3)_3$, $RhCl(CO)(PPh_3)_3$, $IrCl(CO) (PPh)_2$, $NiCl_2(PPh_3)_2$, $PdCl_2(PPh_3)_2$, $PtCl_2(PPh_3)_2$, and $ClAu(PPh_3)$). Other metal complexes such as those with metals noted above but having phosphines except triphenylphosphine may also be effective promoters. In addition, complexes having phosphites such as $P (OPh)_3$, arsines such as $AsPh_3$, and stibines such as $SbPh_3$ may also be promoters.

The amount of the promoter to be added is not specifically defined, but is preferably between $10^{-2}$ and $10^2$ mols, more preferably between $10^{-1}$ and $10^1$ mols, per mol of the catalyst.

The curable composition of the invention may further contain any of fillers, aging retardants, radical inhibitors, UV absorbents, adhesion improvers, flame retardants, cell controlling agents such as polydimethylsiloxane-polyalkylene oxide surfactants or other organic surfactants (polyethylene glycol alkylphenyl ethers, etc.), acid or basic compounds, storage stability improvers, antiozonants, photo-stabilizers, thickeners, plasticizers, coupling agents, antioxidants, thermal stabilizers, conductivity-imparting agents, antistatic agents, radiation-blocking agents, nucleating agents, phosphorus-containing peroxide-degrading agents, lubricants, pigments, metal inactivators, physical properties-regulating agents, etc., without interfering with the object and the effect of the invention.

As specific examples of the fillers, mentioned are glass fiber, carbon fiber, mica, graphite, diatomaceous earth, white clay, fume silica, precipitated silica, silicic anhydride, alumina, carbonblack, calcium carbonate, clay, talc, titanium oxide, magnesium carbonate, barium sulfate, quartz, aluminium powder, flint powder, zinc powder, inorganic balloons, rubber granules, wood powder, phenolic resins, melamine resins, polyvinyl chloride resins, etc.

Herein usable are any ordinary antioxidants, such as citric acid, phosphoric acid, and sulfur-containing antioxidants.

The sulfur-containing antioxidants include mercaptans, salts of mercaptans, sulfides including sulfide-carboxylates and hindered phenol sulfides, polysulfides, salts of dithiocarboxylic acids, thioureas, thiophosphates, sulfonium compounds, thioaldehydes, thioketones, mercaptals, mercaptols, monothioacids, polythioacids, thioamides, sulfoxides, etc.

The radical inhibitors include phenol-based radical inhibitors such as 2,2'-methylene-bis(4-methyl-6-t-butylphenol), tetrakis(methylene-3-(3,5-di-t-butyl-4-hydroxyphenyl) propionate)methane, etc.; and amine-based radical inhibitors such as phenyl-β-naphthylamine, α-naphthylamine, N,N-sec-butyl-p-phenylenediamine, phenothiazine, N,N'-diphenyl-p-phenylenediamine, etc.

The UV absorbents include, for example, 2-(2'-hydroxy-3',5'-di-t-butylphenyl)benzotriazole, bis(2,2,6,6-tetramethyl-4-piperidine) sebacate, etc.

As the adhesion improvers, usable are any ordinary adhesives; silane coupling agents such as aminosilane compounds, epoxysilane compounds, etc.; and other compounds. As specific examples of those adhesion improvers, mentioned are phenolic resins, epoxy resins, γ-aminopropyltrimethoxysilane, N-(β-aminoethyl) aminopropylmethyldimethoxysilane, coumarone-indene resins, rosin ester resins, terpene-phenolic resins, a-methylstyrene-vinyltoluene copolymers, polyethylmethylstyrenes, alkyl titanates, aromatic polyisocyanates, etc.

The flame retardants include halogen-containing flame retardants such as tetrabromobisphenol A, tetrabromobisphenol A-epoxy, decabromodiphenyl oxide, etc.; phosphorus-containing flame retardants such as triethyl phosphate, tricresyl phosphate, tris(chloroethyl) phosphate, tris(chloropropyl) phosphate, tris(dichlorpropyl) phosphate, ammonium polyphosphate, red phosphorus, etc.; and inorganic flame retardants such as aluminium hydroxide, magnesium hydroxide, antimony trioxide, antimony pentoxide, etc. These flame retardants may be used either singly or as combined.

Now, the production method of the invention is described below.

The curable composition of the invention is mixed with a reaction catalyst and optional additives, and foamed and cured togivefoams. The foaming and curing temperature is preferably not higher than 200° C., more preferably not higher than 100° C. At too high temperatures higher than 200° C., the component (A) and the component (B) will cure too rapidly, and the foaming agent (C) will evaporate.

No specific limitation is made on the formulation of the composition. In view of the handlability of the curable composition, however, it is desirable that two or more compositions each consisting essentially of any of the components (A) and (B) are prepared and mixed, and the resulting mixture is cured. The foaming agent (C) may be added to either one of the components (A) and (B), or to both of them in portions. It may be added thereto while the components (A) and (B) are mixed together, or after they are mixed. The method of adding the reaction catalyst (D) is not specifically defined, and any method favorable to the adding operation may be employed. It may be added to either one of the components (A) and (B), or may be added to the system of these components being mixed, or may even be added to the mixture of these components having been mixed.

To produce the foams of the invention, it is desirable that two or more mixtures each comprising the curable composition of the invention, the catalyst and optional additives in any desired combination are separately prepared, mixed just before use, and molded by extrusion or injection. The mixing method is not specifically defined, and any ordinary method of hand mixing, electric mixing, static mixing, collisional mixing or the like is employable.

The foaming method for producing the foams is not also specifically defined, and any ordinary foaming method generally used for producing polyurethane foams, phenolic foams, silicone foams and others is employable herein, which includes, for example, extrusion foaming, continuous foaming, casting foaming, discontinuous foaming, in-field foaming, etc.

The continuous foaming method may be any of a slab foaming method where the composition is freely foamed on paper or plastic film being continuously fed onto a belt conveyer, or a double-conveyer method where the composition is foamed along with a sheet substrate such as paper, plywood, sheet metal or the like, and laminated therewith. In the casting foaming method, the composition is cast into a mold having a desired shape, and foamed and cured therein to give a foam of which the shape corresponds to the inner profile of the mold. The discontinuous foaming method is used for producing sandwich panels, etc. The in-field foaming method includes a simple spraying method for one liquid, a two-liquid spraying method, a two-liquid casting method, and a two-liquid coating method. These are employed essentially for heat insulation of buildings.

Examples of the invention and Comparative Examples are mentioned below, which, however, are not intended to restrict the scope of the invention.

Production Example 1

114 g of bisphenol A, 145 g of potassium carbonate, 140 g of allyl bromide, and 250 ml of acetone were put into a four-neck flask equipped with a thermometer, a reflux condenser, a dropping funnel and a stirring motor, and stirred therein at 60° C. for 12 hours. The supernatant was collected, washed with an aqueous solution of sodium hydroxide in a separatory funnel, and then washed with water. The oil layer was dried with magnesium sulfate, and the solvent was evaporated away. Thus was obtained a pale yellow liquid. Through its $^1$H-NMR, this liquid was identified as allylated bisphenol (allyl ether type) in which the OH group of the bisphenol A moiety was allyletherified.

Production Example 2

The allylated bisphenol that had been obtained in Production Example 1 was heated at 180° C. for 3 hours while being stirred in a nitrogen atmosphere, and it gave a yellow-brown viscous liquid. Through its $^1$H-NMR, this liquid was identified as C-allylated bisphenol in which the allyl group was Claisen-rearranged (A-1).

Production Example 3

36.9 g of novolak-phenol resin (PSM4261, manufactured by Gun-ei Chemical Co.; having an OH content of 9.71 mmols/g) and 160 ml of acetone were put into a four-neck flask equipped with a thermometer, a reflux condenser, a dropping funnel and a stirring motor, to which was added 50 g of potassium carbonate with stirring. Then, 52 g of allyl bromide was dropwise added thereto little by little, and reacted at 55° C. for 6 hours. The reaction mixture was filtered, concentrated, and washed with alkali and acid in that order, and thereafter the solvent was evaporated away. Thus was obtained a pale yellow liquid. Through its $^1$H-NMR, this liquid was identified as O-allylated novolak-phenol resin (allyl ether type) in which the OH group was allylated (A-2).

Production Example 4

A stirrer, a dropping funnel, a condenser equipped with a three-way stop cock at its top, and a thermometer were fitted to a 1-liter four-neck flask. 120 g of methylhydrogenpolysiloxane (KF-99, manufactured by Shin-etsu Chemical Co.) (2.0 mols in terms of SiH), 241 μl of a xylene solution of platinum-vinylsiloxane complex ($2.0 \times 10^{-2}$ mmols in terms of platinum atom), and 120 ml of toluene were put into this flask. The resulting mixture was heated at 80° C., and a solution of 70 g of ethylene oxide polymer (its one terminal was modified with a methyl group and the other terminal was with an allyl group, and this had a number-average molecular weight of 350) (0.20 mmols in terms of allyl) as dissolved in 70 ml of toluene was dropwise added to the mixture over a period of 0.5 hours. After the addition, the mixture was further stirred at 80° C. for 2 hours. Then, this was filtered, and the resulting filtrate was concentrated to obtain a colorless transparent liquid. Through its $^1$H-NMR, this liquid was identified as polyalkylene oxide-modified methylhydrogenpolysiloxane (B-1).

Production Example 5

120 g of methylhydrogenpolysiloxane and 52 g (0.5 mols) of styrene were processed in the same manner as in Production Example 4 to obtain a colorless, transparent, viscous liquid of styrene-modified methylhydrogenpolysiloxane (B-2).

Production Example 6

A three-way stop cock-equipped condenser, an equalizing dropping funnel, a thermometer, a magnetic tip and a glass stopper were fitted to a 200-ml four-neck flask. 12.03 g of cyclic polyhydrogensiloxane (LS8600, manufactured by Shinetsu Chemical Co.) and 20 ml of toluene were put into this flask, which was then purged with nitrogen. The mixture in the flask was heated at 50° C. with stirring, and a mixture comprised of 20 μl of a solution of chloroplatinic acid catalyst (solution of 1 g of $H_2PtCl_6.6H_2O$ as dissolved in 1 g of ethanol and 9 g of 1,2-dimethoxyethane), 30 ml of toluene and 2.76 g of 1,9-decadiene was dropped into the flask over a period of 2 hours. After the addition, these were reacted at 50° C. for further 1 hour. The reaction mixture was washed with an aqueous saturated solution of ammonium chloride (100 ml×2) and ion-exchanged water (100 ml×1), and then dried with sodium sulfate. The volatiles were evaporated away, and a colorless transparent liquid was obtained. Through its NMR and others, this liquid was identified as decadiene of which the both terminals were modified with cyclic polysiloxane (B-3).

EXAMPLE 1

0.6 g of a xylene solution of platinum-vinylsiloxane (1.9% by weight in terms of platinum atom) and 6.0 g of HCFC141b were added to 15.4 g of C-allylated bisphenol (A-1) that had been prepared in Production Example 2, and stirred to prepare a composition. This was mixed with 11.0 g of polyalkylene oxide-modified methylhydrogenpolysiloxane (B-1) that had been prepared in Production Example 4, at room temperature, whereupon the resulting mixture was foamed, while generating heat, to give a foam having an expansion ratio of about 6 times.

EXAMPLE 2

0.1 g of a xylene solution of platinum-vinylsiloxane (1.9% by weight in terms of platinum atom) was added to 15.4 g of C-allylated bisphenol (A-1) that had been prepared in Production Example 2, and stirred to prepare a composition. This was rapidly mixed with 20.4 g or styrene-modified methylhydrogenpolysiloxane (B-2) that had been prepared in Production Example5, and 4.0 g of HCFC141b, at room temperature, whereupon the resulting mixture was foamed, while generating heat, to give a foam having an expansion ratio of about 5 times.

EXAMPLE 3

0.6 g of a xylene solution of platinum-vinylsiloxane (1.9% by weight in terms of platinum atom) and 10.0 g of pentafluoropropane (R245fa) were added to 15.4 g of C-allylated bisphenol (A-1) that had been prepared in Production Example 2, and stirred to prepare a composition. This was mixed with 11.0 g of polyalkylene oxide-modified methylhydrogenpolysiloxane (B-1) that had been prepared in Production Example 4, at room temperature, whereupon the resulting mixture was foamed, while generating heat, to give a foam having an expansion ratio of about 25 times.

EXAMPLE 4

0.15 g of a xylene solution of platinum-vinylsiloxane (1.9% by weight in terms of platinum atom) and 3.2 g of pentafluoropropane (R245fa) were added to 10.8 g of C-allylated bisphenol (A-1) that had been prepared in Production Example 2, and stirred to prepare a composition. This was mixed with 10.6 g of polyalkylene oxide-modified methylhydrogenpolysiloxane (B-1) that had been prepared in Production Example 4, at room temperature, whereupon the resulting mixture was foamed, while generating heat, to give a foam having an expansion ratio of about 26 times.

EXAMPLE 5

0.15 g of a xylene solution of platinum-vinylsiloxane (1.9% by weight in terms of platinum atom) and 2.0 g of tetrafluoroethane (R134a) were mixed with 10.8 g of C-allylated bisphenol (A-1) that had been prepared in Production Example 2, in an autoclave to prepare a composition. This was mixed with 10.6 g of polyalkylene oxide-modified methylhydrogenpolysiloxane (B-1) that had been prepared in Production Example 4, whereupon the resulting mixture was foamed, while generating heat, to give a foam having an expansion ratio of about 25 times.

EXAMPLE 6

0.6 g of a xylene solution of platinum-vinylsiloxane (1.9% by weight in terms of platinum atom) and 5.0 g of cyclopentane were added to 17.0 g of O-allylated novolakphenol resin (allyl ether type) (A-2) that had been prepared in Production Example 3, and stirred to prepare a composition. This was mixed with 10.7 g of polyalkylene oxide-modified methylhydrogenpolysiloxane (B-1) that had been prepared in Production Example 4, at room temperature, whereupon the resulting mixture was foamed, while generating heat, to give a foam having an expansion ratio of about 6 times.

EXAMPLE 7

0.1 g of a xylene solution of platinum-vinylsiloxane (1.9% by weight in terms of platinum atom) was added to 15.4 g of C-allylated bisphenol (A-1) that had been prepared in Production Example 2, and stirred to prepare a composition. This composition was put into a 100-ml stainless steel autoclave, into which was introduced carbon dioxide to be up to an increased pressure of 10 kgf/cm$^2$, with stirring (liquid A). On the other hand, 11.0 g of polyalkylene oxide-modified methylhydrogenpolysiloxane (B-1) that had been prepared in Production Example 4 was put into a different autoclave, into which was introduced carbon dioxide to be up to an increased pressure of 10 kgf/cm$^2$ in the same manner as above (liquid B). The liquid A and the liquid B were gradually jetted out, while their temperatures were controlled with heaters, to give a foam having an expansion ratio of about 5 times.

EXAMPLE 8

14.2 g of the composition described in Example 4, which was comprised of C-allylated bisphenol, platinum-vinylsiloxane solution and pentafluoropropane (R245fa), and 10.6 g of modified methylhydrogenpolysiloxane (B-1) were mixed in a static mixer, and cast into a capped aluminium container (length 15 cm, width 15 cm, depth 2.5 cm). Then, the mixture foamed in the container to give a foam having the same volume as that of the container.

EXAMPLE 9

14.2 g of the composition described in Example 4, which was comprised of C-allylated bisphenol, platinum-vinylsiloxane solution and pentafluoropropane (R245fa), and 10.6 g of modified methylhydrogenpolysiloxane (B-1) were separately pressurized with nitrogen, mixed by collision, and jetted out through a spray gum onto the surface of a vertical concrete substrate. The thus-sprayed mixture foamed and cured, without falling in drops, to give a flat foam having a smooth surface and having a uniform thickness.

EXAMPLE 10

A piece of cold rolled steel plates sheet, of which the surface had been well cleaned, was pierced into the foam produced in Example 1, and left in an atmosphere at a temperature of 35° C. and a relative humidity of 60% for 1 week. Then, the sheet steel piece was drawn out and macroscopically observed. No rust was found around it.

Comparative Example 1

1.4 g of an aqueous solution of 70% paratoluenesulfonic acid was added to a mixture comprised of 20.0 g of a commercially-available resol-type phenolic resin, 0.4 g of a silicone surfactant and 1.0 g of HCFC141b, and mixed, whereupon the resulting mixture was foamed, while generating heat, to give a foam having an expansion ratio of about 6 times. This was left in an atmosphere at a temperature of 35° C. and a relative humidity of 60% for 1 week, with a sheet steel piece being pierced thereinto in the same manner as in Example 10. After having been drawn out of the foam, the steel piece was covered with much rust on its entire surface.

Industrial Applicability

The curable composition of the invention is foamed and cured at room temperature or under heat at relatively low temperatures. In addition, as being poorly corrodable and poorly toxic, foams of the composition are widely used for soundproofing, heat insulation, water sealing, vapor sealing, damping, protection, cushioning, decoration, etc.

For vehicles, for example, the present invention is applicable to cushions, ceilings, cores in door trims, damping and sound-absorbing materials in floor cushions, heat-insulating materials in car coolers, air sealants in dampers, water-sealing parts, gaskets, air filters, center pillar garnishes, head linings, quarter light trims, dust covers, safety foams in fuel tanks, oil filters, flexible containers, crush pads, sun visors, head rests, insulators, dashboards, door panels, pillars, consoles, energy-absorbing bumpers, heat-insulating materials in freezer vans, refrigerator vans, tank lorries, freezing and refrigerating container trucks, sound-absorbing materials in girder bridges, etc.; for ships, it is applicable to heat-insulating materials, buoyant materials, cores in FRP boards, buoys, etc.; for bedding, it is applicable to cushions, etc.; for furniture, it is applicable to cushions, packing materials, etc.; for electric and electronic instruments, it is applicable to filters, sound-absorbing and heat-insulating materials, sound-absorbing materials in printers, ear pads in headphones, etc.; for packages, it is applicable to shock absorbers; for building and construction, it is applicable to heat-insulating materials in roofs, ceilings, walls and floors, covers of water pipes, door panels, siding panels, cores in metal siding panels, cores in partitioning panels, cores in tatami (straw mats) and fusuma (papered sliding doors), heat-insulating cores in bath tubs, joints, sealants, cable sealants, adhesives, heat-insulating panels in system ceilings, heat-insulating and water-proofing materials in roofs, air-sealing and heat-insulating materials in refrigerator storehouses and airtight storehouses, heat-insulating materials in plant tanks and pipes, etc.; for household electric appliances, it is applicable to heat-sealing materials in refrigerators, freezers and electric jars, dew inhibitors in air conditioners, etc.; for daily necessaries, it is applicable to sports goods, medical appliances, powder puffs for cosmetics, shoulder pads, slippers, sandals, kenzans (pin holders), toys, etc.

In addition, the curable composition, the foams of the composition and the method for producing them of the invention are applicable to patterning of articles through injection molding, to formation of model samples using patterns, and to formation of decorations and accessories.

We claim:

1. A curable composition comprising;
   (A) a phenolic compound having a carbon-carbon double bond,
   (B) a compound having an SiH group, and
   (C) a foaming agent,
   the composition being curable through hydrosilylation of said component (A) and said component (B).

2. The curable composition as claimed in claim 1, which additionally contains (D) a hydrosilylation catalyst.

3. The curable composition as claimed in claim 1 or 2, wherein the phenolic compound of said component (A) has a molecular backbone comprising at least one structure selected from the following formulae (1) to (3):

(1)

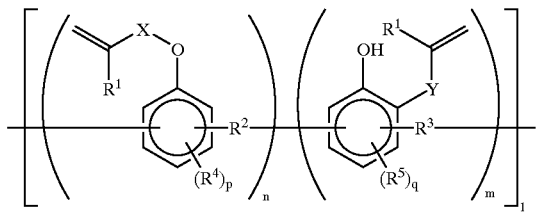

wherein $R^1$ represents H or $CH_3$; $R^2$ and $R^3$ each represent a divalent substituent having from 1 to 6 carbon atoms; $R^4$ and $R^5$ each represent a hydroxyl group and/or a monovalent substituent having from 0 to 6 carbon atoms; X and Y each represent a divalent substituent having from 0 to 10 carbon atoms; n and m each represent an integer of from 0 to 300; l represents an integer of from 1 to 300; and p and q each represent an integer of from 0 to 3;

(2)

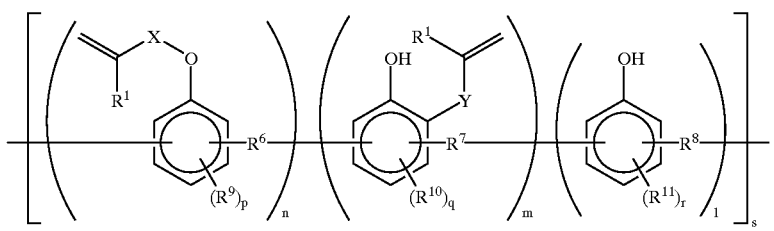

wherein $R^1$ represents H or $CH_3$; $R^6$, $R^7$ and $R^8$ each represent a divalent substituent having from 1 to 6 carbon atoms; $R^9$, $R^{10}$ and $R^{11}$ each represent a hydroxyl group and/or a monovalent substituent having from 0 to 6 carbon atoms; X and Y each represent a divalent substituent having from 0 to 10 carbon atoms; n and m each represent an integer of from 0 to 300; l and s each represent an integer of from 1 to 300; and p, q and r each represent an integer of from 0 to 3;

(3)

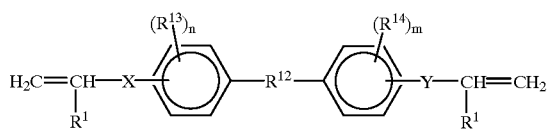

wherein $R^1$ represents H or $CH_3$; $R^{12}$ represents a divalent substituent having from 0 to 6 carbon atoms; $R^{13}$ and $R^{14}$ each represent a hydroxyl group and/or a monovalent substituent having from 0 to 10 carbon atoms; X and Y each represent a divalent substituent having from 0 to 10 carbon atoms; and n and m each represent an integer of from 0 to 4.

4. The curable composition as claimed in claim 1 or 2, wherein the SiH-having compound of said component (B) is a compound to be represented by the following structural formula (4):

(4)

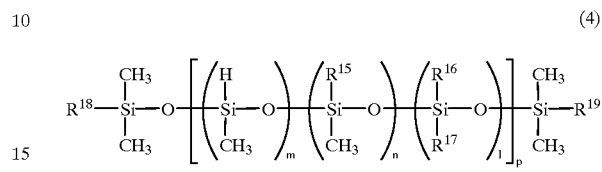

wherein $m \geq 2$; n, l, $p \geq 0$; $10 \leq (m+n+l) \times p \leq 80$; $R^{16}$, $R^{17}$, $R^{18}$ and $R^{19}$ each represent a hydrogen atom or a hydrocarbon group having from 1 to 20 carbon atoms, which may have at least one phenyl group; $R^{15}$ represents a substantially polyoxyalkylene group, and/or an organic group derived from the reaction of a hydrosilyl group with an alkenyl-aromatic compound.

5. The curable composition as claimed claim 1 or 2, wherein the foaming agent of said component (C) is a volatile compound having a boiling point of not higher than 100° C.

6. The curable composition as claimed in claim 5, wherein the volatile compound is selected from hydrocarbons, flons, carbon dioxide, air and nitrogen.

7. A method for producing foams, which comprises preparing at least two compositions each comprising, as the main component, any of the component (A) and the component (B) of the curable composition of claim 1 or 2, followed by mixing them, and foaming and curing the resulting mixture.

8. A method for producing foams, which comprises preparing at least two compositions each comprising, as the main component, any of the component (A) and the component (B) of the curable composition of claim 1 or 2, followed by mixing them just before use, and directly spraying or casting the resulting mixture over the surface of a substrate, and foaming and curing it.

9. Foams as produced according to the method of claim 1 or 2.

* * * * *